United States Patent
Baron et al.

(10) Patent No.: US 9,058,299 B2
(45) Date of Patent: Jun. 16, 2015

(54) EFFICIENT COPYING BETWEEN STORAGE DEVICES

(71) Applicants: Ayal Baron, Kiryat Ono (IL); Saggi Y. Mizrahi, Fierberg (IL)

(72) Inventors: Ayal Baron, Kiryat Ono (IL); Saggi Y. Mizrahi, Fierberg (IL)

(73) Assignee: Red Hat Israel, Ltd., Raanana (IL)

( * ) Notice: Subject to any disclaimer, the term of this patent is extended or adjusted under 35 U.S.C. 154(b) by 217 days.

(21) Appl. No.: 13/736,810

(22) Filed: Jan. 8, 2013

(65) Prior Publication Data
US 2014/0195752 A1    Jul. 10, 2014

(51) Int. Cl.
*G06F 11/14* (2006.01)
*G06F 12/08* (2006.01)

(52) U.S. Cl.
CPC ........ *G06F 11/1466* (2013.01); *G06F 11/1451* (2013.01); *G06F 11/1456* (2013.01); *G06F 2201/815* (2013.01); *G06F 2201/84* (2013.01)

(58) Field of Classification Search
CPC ......... G06F 12/02; G06F 12/08; G06F 11/14; G06F 11/1446; G06F 11/1451
USPC ........................................................ 711/162
See application file for complete search history.

(56) References Cited

U.S. PATENT DOCUMENTS

| | | | |
|---|---|---|---|
| 8,135,930 B1 * | 3/2012 | Mattox et al. ................. | 711/162 |
| 8,250,033 B1 * | 8/2012 | De Souter et al. ............ | 707/637 |
| 8,417,907 B2 * | 4/2013 | Urkude et al. ................ | 711/162 |
| 8,656,123 B2 * | 2/2014 | Lee ................ | 711/162 |
| 2006/0085610 A1 * | 4/2006 | Iwamura et al. .............. | 711/162 |
| 2006/0236047 A1 * | 10/2006 | Shitomi ....................... | 711/162 |
| 2010/0057789 A1 * | 3/2010 | Kawaguchi ................... | 707/204 |
| 2010/0082921 A1 * | 4/2010 | Thompson et al. ........... | 711/162 |
| 2011/0029748 A1 * | 2/2011 | Nakamura et al. ............ | 711/162 |
| 2012/0066677 A1 * | 3/2012 | Tang ................ | 718/1 |
| 2012/0079221 A1 * | 3/2012 | Sivasubramanian et al. . | 711/162 |
| 2013/0024635 A1 * | 1/2013 | Araki ............................ | 711/162 |
| 2013/0042083 A1 * | 2/2013 | Mutalik et al. ................ | 711/162 |
| 2013/0282662 A1 * | 10/2013 | Kumarasamy et al. ....... | 707/649 |

* cited by examiner

*Primary Examiner* — Hal Schnee
(74) *Attorney, Agent, or Firm* — Lowenstein Sandler LLP

(57) ABSTRACT

A system and method are disclosed for efficiently copy a disk image between storage devices. In accordance with one example, a computer system issues a request to create on a first storage device a snapshot of a first disk image that is stored on the first storage device. The computer system then issues a request to create on the first storage device a second disk image based on the snapshot, and copies the snapshot on to a second storage device. The computer system issues a request to create on the second storage device a third disk image based on the snapshot. The computer system then issues a request to compute a difference between the second disk image and the snapshot, and the difference is overwritten on to the third disk image.

17 Claims, 3 Drawing Sheets

EFFICIENT COPYING BETWEEN STORAGE DEVICES

TECHNICAL FIELD

This disclosure relates to computer systems, and more particularly, to copying data from one storage device to another storage device.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, a hard disk, a solid-state drive, etc.). The hypervisor manages these mappings in a transparent fashion, thereby enabling the guest operating system and applications executing on the virtual machine to interact with the virtual processors and virtual devices as though they were actual physical entities.

A disk image is a single file or storage device containing the complete contents and structure representing a data storage medium or device, such as a hard drive, tape drive, floppy disk, optical disc, or USB flash drive. A disk image may be created by creating a complete sector-by-sector copy of the source medium, thereby replicating the structure and contents of a storage device.

In a virtualized system, a disk image is interpreted by the hypervisor as a system hard disk drive. Typically the disk image is named for the particular hypervisor; for example, a disk image for VMware™ vSphere™ typically has the extension .vmdk, a disk image for Xen™ and Microsoft™ Hyper-V™ typically has the extension .vhd, and a disk image for Oracle™ VM VirtualBox™ typically has the extension .vdi.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and method for efficiently copy a disk image from one storage device to another storage device. In accordance with one example, a snapshot of a first disk image that is stored on a first storage device is created on the first storage device. A second disk image is then created on the first storage device based on the snapshot, so that the second disk image captures what the state of the first disk image was at the time of the snapshot. (The first disk image may have changed since the snapshot was taken.) The snapshot is then copied to a second storage device, and a third disk image is created on the second storage device based on the snapshot, so that the third disk image captures what the state of the first disk image was at the time of the snapshot, just as was the case when the second disk image was initially created on the first storage device. A difference between the snapshot and the second disk image, which may have changed since it was created based on the snapshot, is computed. The difference is then overwritten on to the third disk image stored on the second storage device.

Examples of the present disclosure thus enable up-to-date disk images to be efficiently copied from one storage device to another storage device. In contrast, in virtualized systems of the prior art, the entire disk image is copied between storage devices. Moreover, examples of the present disclosure enable efficient copying of virtual disks of a virtual machine without requiring shutdown of the virtual machine.

Figure 1:
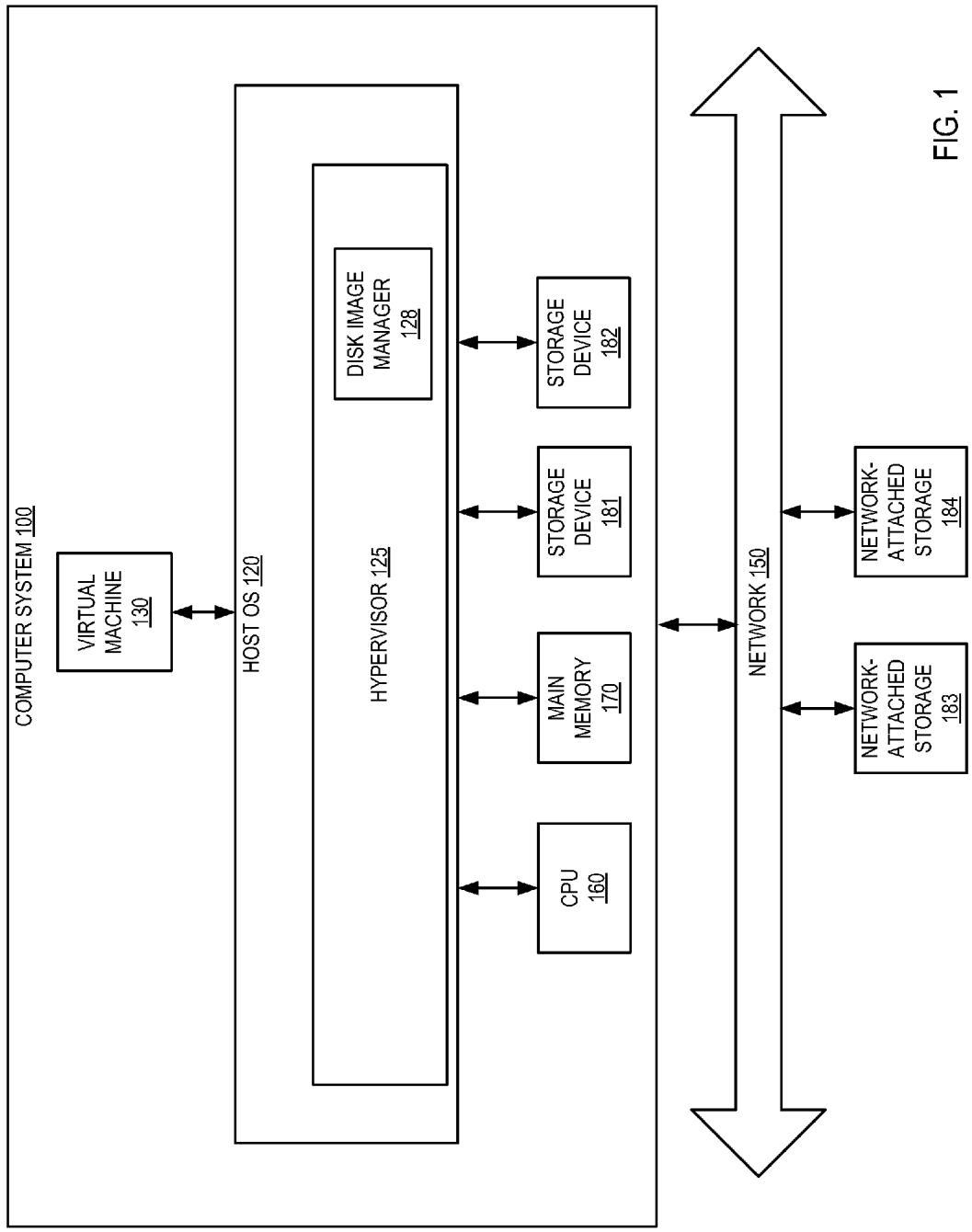
FIG. 1 depicts an illustrative computer system architecture, in accordance with an example of the present disclosure.

FIG. 1 depicts an illustrative architecture of the salient elements of a computer system 100, in accordance with some embodiments. It should be noted that other architectures for computer system 100 are possible, and that the present disclosure is not necessarily limited to the specific architecture depicted by FIG. 1.

As shown in FIG. 1, the computer system 100 is connected to a network 150 and comprises central processing units (CPU) 160, main memory 170, which may include volatile memory devices (e.g., random access memory (RAM)), non-volatile memory devices (e.g., flash memory), and/or other types of memory devices, storage devices 181 and 182 (each of which may be a magnetic hard disk, a Universal Serial Bus [USB] solid state drive, etc.), and network-attached storage devices 183 and 184. The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that the fact that there are two storage devices 181 and 182 and two network-attached storage devices 183 and 184 is merely illustrative, and in some other examples there may be a different number of storage devices and network-attached storage devices. The configuration depicted in FIG. 1, however, enables copying from a storage device to a network-attached storage device, or from a network-attached storage device to a storage device, or between two storage devices, or between two network-attached storage devices. Similarly, although a single CPU is depicted in FIG. 1, in some other examples computer system 100 may comprise a plurality of CPUs.

Computer system 100 runs a host operating system (OS) 120 that manages the hardware resources of the computer system and provides functions such as interprocess communication, scheduling, virtual memory management, and so forth. In one example, host operating system 120 also comprises a hypervisor 125, which provides a virtual operating platform for one or more virtual machines 130 and manages execution of one or more virtual machines 130. In accordance with this example, hypervisor 125 includes a disk image manager 128 that is capable of creating a snapshot of a disk image (e.g., a file that captures the entire state of the disk image at a particular point in time), of creating new disk images based on snapshots, of copying snapshots between storage devices (e.g., from storage device 181 to storage device 182, from storage device 181 to network-attached storage device 183, from network-attached storage device 183 to network-attached storage device 184, etc.), and of computing differences between snapshots and disk images. Some operations of disk image manager 128 are described in detail below with respect to the method of FIG. 2.

It should be noted that in some alternative examples, hypervisor 125 may be external to host OS 120, rather than embedded within host OS 120. It should further be noted that in examples where disk image manager 128 is responsible only for managing disk images unrelated to virtual machines, disk image manager 128 may be a module of host OS 120, rather than a module of hypervisor 125.

Virtual machine 130 is a software implementation of a machine that executes programs as though it were an actual physical machine. Virtual machine 130 comprises a guest operating system that manages the execution of programs within the virtual machine, as well as one or more virtual processors that are mapped by hypervisor 125 to physical CPU(s) 160 of computer system 100. It should be noted that although, for simplicity, a single virtual machine is depicted in FIG. 1, in some other examples computer system 100 may host a plurality of virtual machines.

Figure 2:
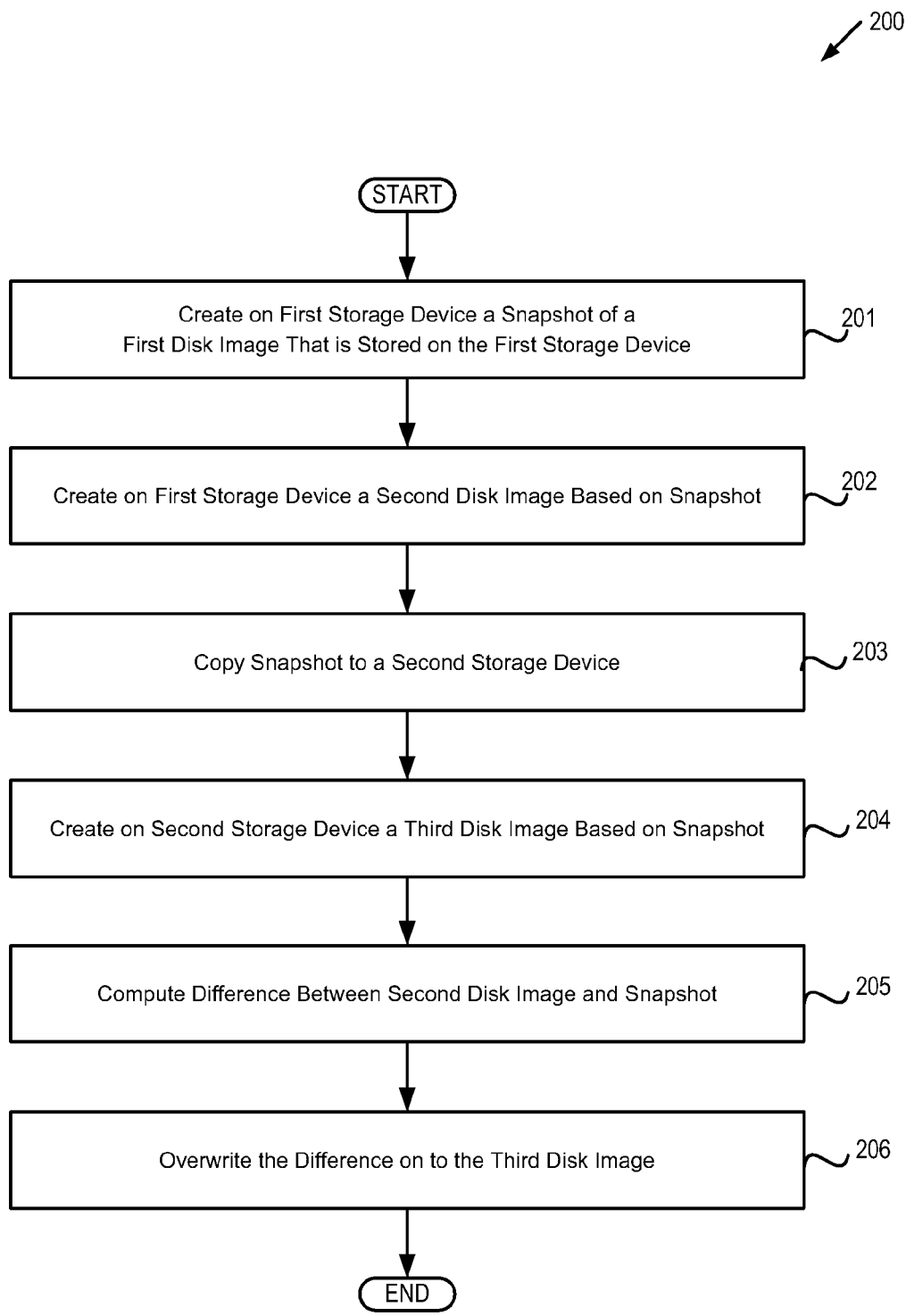
FIG. 2 depicts a flow diagram of one example of a method for efficiently copying a disk image between storage devices.

FIG. 2 depicts a flow diagram of one example of a method 200 for efficiently copying a disk image between storage devices. The method is performed by processing logic that may comprise hardware (circuitry, dedicated logic, etc.), software (such as is run on a general purpose computer system or a dedicated machine), or a combination of both. In one example, the method is performed by the computer system 100 of FIG. 1, while in some other examples, some or all of the method might be performed by another machine. It should be noted that blocks depicted in FIG. 2 can be performed simultaneously or in a different order than that depicted.

At block 201, a snapshot of a first disk image that is stored on a first storage device is created on the first storage device. The snapshot thus captures the state of the first disk image at the time that the snapshot is created. In some embodiments, block 201 may be performed in response to an administrator submitting a command to computer system 100 (e.g., via a graphical user interface [GUI], etc.) to copy the first disk image from the first storage device to a second storage device, while in some other embodiments, block 201 may be performed as part of a scheduled job to copy the first disk image from the first storage device to a second storage device, while in yet other embodiments, block 201 may be performed in response to some other event (e.g., the starting of a virtual machine, etc.).

In one example, when the first storage device supports native snapshotting (e.g., a capability by which the storage device can create snapshots) the disk image manager 128 issues a request (e.g., a dedicated command, etc.) to a native snapshotting module on the first storage device to create the snapshot. Alternatively (e.g., when the first storage device lacks a native snapshotting capability, etc.), the disk image manager 128 may issue a request to hypervisor 125 or host OS 120 to create the snapshot. In one example, disk image manager 128 may issue a query to the first storage device to determine whether the first storage device supports native snapshotting. In another example, disk image manager 128 may obtain this information from hypervisor 125 or host OS 120.

It should be noted that the first disk image may be a virtual disk of a virtual machine (e.g., VM 130, etc.), or may be unrelated to virtual machines (e.g., a conventional disk image of a hard drive, etc.). It should further be noted that when the first disk image is a virtual disk of a virtual machine, the creation of the snapshot at block 201 does not require shutdown of the virtual machine. It should further be noted that the first storage device may be either a network-attached storage device (e.g., network-attached storage device 183, network-attached storage device 184, etc.) or a storage device local to computer system 100 (e.g., storage device 181, storage device 182, etc.).

At block 202, a second disk image is created on the first storage device based on the snapshot. In one example, disk image manager 128 issues a request to hypervisor 125 or host OS 120 to create the second disk image from the snapshot. At this point, the second disk image is an exact copy of the first disk image at the time that the snapshot was taken.

At block 203, the snapshot is copied to a second storage device, which is the target device for copying of the first disk image from the first storage device. In one example, disk image manager 128 issues a request to hypervisor 125 or host OS 120 to copy the snapshot to the second storage device. In one example, when the second storage device supports native snapshotting, the copying of the snapshot comprises creating, by the second storage device, a native snapshot of the first disk image on the second storage device. In one such example, disk image manager 128 issues a request to the second storage device to create the native snapshot of the first disk image on the second storage device.

Alternatively (e.g., when the second storage device lacks a native snapshotting capability, etc.), the copying of the snapshot to the second storage device comprises creating a structure on the second storage device. In one embodiment, the structure may be in a native Quick EMUlator (QEMU) Copy On Write (or "QCOW") disk imaging format, which includes a table that indicates which logical portions of the image have been written and the physical mapping of the logical portions to the file. In one example, the table is represented as two arrays, where the first array is a list of logical addresses and the second array is a list of data stored in the corresponding logical addresses. In the case where data is read from a logical address that is not known, it is searched on a backing file, if such a file exists; otherwise, an empty block is returned.

In one example, disk image manager 128 issues a request to hypervisor 125 or host OS 120 to create the structure on the second storage device. It should be noted that the second storage device, like the first storage device, may be either a network-attached storage device (e.g., network-attached storage device 183, network-attached storage device 184, etc.) or a storage device local to computer system 100 (e.g., storage device 181, storage device 182, etc.).

At block 204, a third disk image is created on the second storage device based on the snapshot. At this point, the third disk image is an exact copy of the first disk image at the time that the snapshot was taken.

At block 205, a difference between the second disk image and the snapshot is computed. This difference captures any changes that have occurred to the second disk image (e.g., state changes, configuration changes, etc.) since it was created from the snapshot. In one example, disk image manager 128 issues a request to the first storage device to compute the difference (e.g., when the first storage device has a capability for computing such differences), while in another example, disk image manager 128 issues a request to hypervisor 125 or host OS 120 to compute the difference.

At block 206, the difference computed at block 206 is overwritten on to the third disk image stored on the second storage device. The result is that the third disk image is now an exact copy of the second disk image, without re-copying the entire second disk image from the first storage device to the second storage device.

Figure 3:
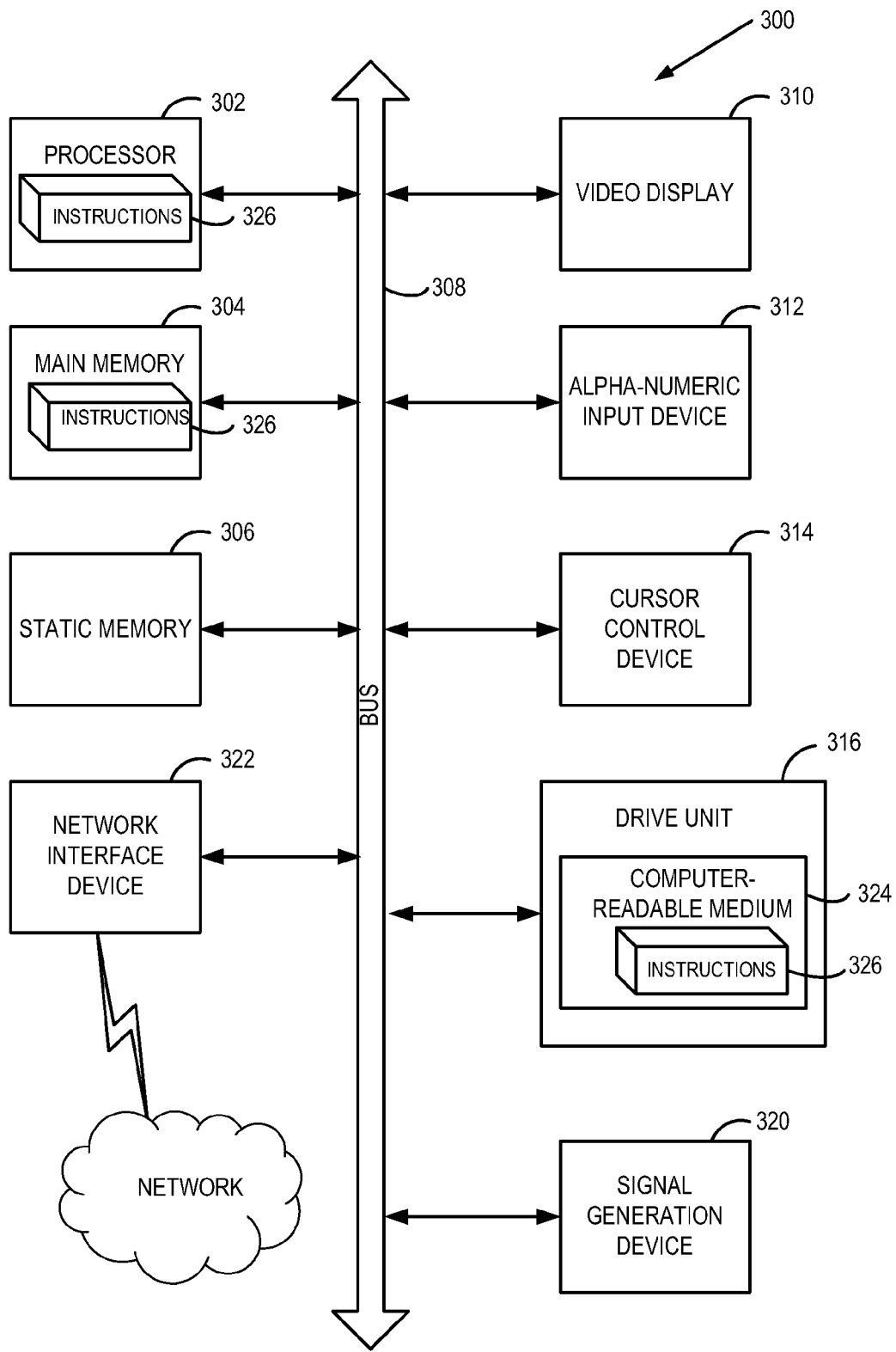
FIG. 3 depicts a block diagram of an illustrative computer system operating in accordance with examples of the disclosure.

FIG. 3 illustrates an illustrative computer system within which a set of instructions, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the method of FIG. 3, etc.) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "creating", "copying", "computing", "overwriting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
issuing, by a processor, a request to create on a first storage device a snapshot of a first disk image that is stored on the first storage device;
issuing a request to create on the first storage device a second disk image in view of the snapshot;
copying the snapshot on to a second storage device;
issuing a request to create on the second storage device a third disk image in view of based on the snapshot;
issuing a request to compute a difference by the first storage device between the second disk image and the snapshot; and
overwriting the difference on to the third disk image.

2. The method of claim 1 wherein the snapshot is created by the first storage device.

3. The method of claim 2, wherein when the second storage device does not support native snapshotting, the copying of the snapshot on to the second storage device comprises creating, by the processor, a structure on the second storage device.

4. The method of claim 3 wherein the structure is a Quick EMUlator (QEMU) Copy On Write structure.

5. The method of claim 2, wherein when the second storage device supports native snapshotting, the copying of the snapshot on to the second storage device comprises creating a native snapshot of the first disk image on the second storage device.

6. The method of claim 1 wherein the snapshot is created by the processor.

7. The method of claim 1 wherein the first disk image is a virtual disk of a virtual machine.

8. An apparatus comprising:
an interface device to connect a processor to one or more storage devices; and
the processor coupled to the interface device, to:
create on a first storage device of the one or more storage devices, via the interface device, a snapshot of a first disk image that is stored on the first storage device;
create on the first storage device, via the interface device, a second disk image in view of the snapshot;
copy, via the interface device, the snapshot on to a second storage device;
create on the second storage device, via the interface device, a third disk image in view of the snapshot;
issue a request to compute a difference by the first storage device between the second disk image and the snapshot; and
overwrite, via the interface device, the difference on to the third disk image.

9. The apparatus of claim 8, wherein when the second storage device does not support native snapshotting, the copying of the snapshot on to the second storage device comprises creating a structure on the second storage device.

10. The apparatus of claim 9 wherein the structure is a Quick EMUlator (QEMU) Copy On Write structure.

11. The apparatus of claim 8, wherein when the second storage device supports native snapshotting, the copying of the snapshot on to the second storage device comprises creating a native snapshot of the first disk image on the second storage device.

12. A non-transitory computer readable storage medium, having instructions stored therein, which when executed, cause a processor to:
issue a request to create on a first storage device a snapshot of a first disk image that is stored on the first storage device;
issue a request to create on the first storage device a second disk image in view of based on the snapshot;
copy the snapshot on to a second storage device;
issue a request to create on the second storage device a third disk image in view of the snapshot;
issue a request to compute a difference by the first storage device between the second disk image and the snapshot; and
overwrite the difference on to the third disk image.

13. The non-transitory computer readable storage medium of claim 12 wherein the first disk image is a virtual disk of a virtual machine.

14. The non-transitory computer readable storage medium of claim 12 wherein the snapshot is created by the first storage device.

15. The non-transitory computer readable storage medium of claim 14, wherein when the second storage device does not support native snapshotting, the instructions to copy the snapshot on to the second storage device comprises creating a structure on the second storage device.

16. The non-transitory computer readable storage medium of claim 14, wherein when the second storage device supports native snapshotting, the instructions to copy the snapshot on to the second storage device comprises creating a native snapshot of the first disk image on the second storage device.

17. The non-transitory computer readable storage medium of claim 12 wherein the snapshot is created by the processor.

* * * * *